United States Patent
Pottier et al.

(10) Patent No.: US 9,103,068 B2
(45) Date of Patent: Aug. 11, 2015

(54) IN-SITU-RUBBERIZED LAYERED CORD THAT CAN BE USED IN A TIRE BELT

(75) Inventors: Thibaud Pottier, Malauzat (FR); Henri Barguet, Les Martres-d'Artiere (FR)

(73) Assignees: Michelin Recherche et Technique S.A., Granges-Paccot (CH); COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 684 days.

(21) Appl. No.: 12/810,961

(22) PCT Filed: Dec. 22, 2008

(86) PCT No.: PCT/EP2008/011000
§ 371 (c)(1),
(2), (4) Date: Oct. 4, 2010

(87) PCT Pub. No.: WO2009/083212
PCT Pub. Date: Jul. 9, 2009

(65) Prior Publication Data
US 2011/0017376 A1    Jan. 27, 2011

(30) Foreign Application Priority Data
Dec. 28, 2007 (FR) .................. 07 09162

(51) Int. Cl.
*B60C 9/00* (2006.01)
*B60C 9/18* (2006.01)
(Continued)

(52) U.S. Cl.
CPC .......... *D07B 1/0626* (2013.01); *B60C 9/0007* (2013.04); *B60C 9/2006* (2013.04);
(Continued)

(58) Field of Classification Search
CPC .... D07B 1/626; D07B 1/0606; D07B 1/0633; B60C 9/0007; B60C 9/2006; B60C 2009/0021
USPC .................. 152/451, 527, 556; 57/212, 902
See application file for complete search history.

(56) References Cited

U.S. PATENT DOCUMENTS 5,139,874 A * 8/1992 Starinshak et al. ........... 428/375
(Continued)

FOREIGN PATENT DOCUMENTS

DE     102004036807    *  3/2006
EP     1 186 699          3/2002
(Continued)

OTHER PUBLICATIONS

English machine translation of DE102004036807, dated Mar. 2006.*
(Continued)

*Primary Examiner* — Justin Fischer
*Assistant Examiner* — Robert Dye
(74) *Attorney, Agent, or Firm* — Cozen O'Connor (57) ABSTRACT

Metal cord (C-1) having two layers (Ci, Ce) of 3+N construction, rubberized in situ, comprising an inner layer (Ci) formed from three core wires (10) of diameter $d_1$ wound together in a helix with a pitch $p_1$ and an outer layer (Ce) of N wires (11) N varying from 6 to 12, of diameter $d_2$, which are wound together in a helix with a pitch $p_2$ around the inner layer (Ci), wherein said cord has the following characteristics ($d_1$, $d_2$, $p_1$ and $p_2$ are expressed in mm): $0.20<d_1<0.50$; $0.20<d_2<0.50$; $p_1/p_2 \leq 1$; $5<p_1<30$; $10<p_2<30$; the inner layer is sheathed with a diene rubber composition called a "filling rubber" (12) which, for any length of cord of at least 2 cm, is present in the central channel (13) formed by the three core wires and in each of the gaps lying between the three core wires (10) and the N wires (11) of the outer layer (Ce); and the content of filling rubber in the cord is between 5 and 30 mg per g of cord.

20 Claims, 4 Drawing Sheets

(51) Int. Cl.
*B07B 1/06* (2006.01)
*D07B 1/06* (2006.01)
*B60C 9/20* (2006.01)

(52) U.S. Cl.
CPC ....... *B60C2009/0021* (2013.04); *D07B 1/0613* (2013.01); *D07B 2201/2006* (2013.01); *D07B 2201/2023* (2013.01); *D07B 2201/2025* (2013.01); *D07B 2201/2028* (2013.01); *D07B 2201/2029* (2013.01); *D07B 2201/2032* (2013.01); *D07B 2201/2039* (2013.01); *D07B 2201/2046* (2013.01); *D07B 2201/2061* (2013.01); *D07B 2201/2062* (2013.01); *D07B 2201/2081* (2013.01); *D07B 2205/2075* (2013.01); *D07B 2207/205* (2013.01); *D07B 2207/4072* (2013.01); *D07B 2501/2046* (2013.01)

(56) References Cited

U.S. PATENT DOCUMENTS 5,609,014 A    3/1997   Obara et al.
6,863,103 B1 *  3/2005  Masubuchi et al. ........... 152/451
8,006,475 B2 *  8/2011  Aoyama ........................ 57/212
2002/0160213 A1  10/2002 Imamiya et al.

FOREIGN PATENT DOCUMENTS

| JP | 2004 036027 |   | 2/2004 |
| JP | 2004-036027 | * | 2/2004 |
| JP | 2004-190199 | * | 7/2004 |
| WO | WO2008/026271 | * | 3/2008 |

OTHER PUBLICATIONS

Anonymous, "High tensile strength steel cord constructions for tyres", Research Disclosure, Mason Publications, vol. 340, No. 54, Aug. 1, 1992.*

English machine translation of JP2004-036027, dated Feb. 2004.*
English machine translation of JP2004-190199, dated Jul. 2004.*

* cited by examiner

IN-SITU-RUBBERIZED LAYERED CORD THAT CAN BE USED IN A TIRE BELT

RELATED APPLICATIONS

This is a U.S. national stage under 35 USC §371 of application No. PCT/EP2008/011001, filed on Dec. 22, 2008.

This application claims the priority of French application no. 07/09163 filed Dec. 28, 2007, the entire content of which is hereby incorporated by reference.

FIELD OF THE INVENTION

The present invention relates to two-layer metal cords of 3+N construction that can be used in particular for reinforcing rubber articles.

It also relates to metal cords of the "in-situ-rubberized" type, i.e. cords that are rubberized from the inside by green (i.e. uncured) rubber during the actual production of said cords.

It also relates to tires and to the crown reinforcements, also called "belts", of these tires, particularly for reinforcing the belts of tires for industrial vehicles, such as heavy vehicles.

BACKGROUND OF THE INVENTION

As is known, a radial tire comprises a tread, two inextensible beads, two sidewalls connecting the beads to the tread, and a belt placed circumferentially between the carcass reinforcement and the tread. This belt is made up of various rubber plies (or "layers") which may or may not be reinforced by reinforcing elements ("reinforcing threads") such as cabled threads or monofilaments, of the metal or textile type.

A tire belt generally consists of at least two superposed belt plies, often called "working" plies or "crossed" plies, the generally metallic reinforcing cords of which are placed so as to be practically parallel to one another within a ply, but at an angle from one ply to another, that is to say they are inclined, whether symmetrically or not, to the median circumferential plane by an angle which is generally between 10° and 45° depending on the type of tire in question. The crossed plies may be accompanied by various other auxiliary rubber plies or layers, which vary in width depending on the case and may or may not comprise reinforcing threads. As an example, mention may be made of simple rubber cushions, so-called "protective" plies responsible for protecting the rest of the belt from outer attack or perforations, or else so-called "hoop" plies having reinforcing threads oriented substantially along the circumferential direction (so-called "zero-degree" plies), irrespective of whether they are radially outer or inner to the crossed plies.

As is known, such a tire belt must meet various often contradictory requirements, in particular:

it must be as rigid as possible at low deformation, as it contributes substantially to stiffening the tire crown;
it must have as low a hysteresis as possible, in order, on the one hand, to minimize tire heating of the inner region of the crown during travel and, on the other hand, to reduce the rolling resistance of the tire, synonymous with fuel economy; and
finally, it must have a high endurance, in particular with respect to the phenomenon of separation, i.e. cracking of the ends of the crossed plies in the shoulder region of the tire, known as "cleavage", which in particular requires metal cords that reinforce the belt plies to have a high compressive fatigue strength, while being in a relatively corrosive atmosphere.

The third requirement is particularly demanding in the case of tires for industrial vehicles, such as heavy vehicles, which are designed to be retreaded one or more times when their treads reach a critical state of wear after prolonged running.

To reinforce the above belts, it is general practice to use what are called "layered" steel cords formed from a central core and one or more layers of concentric wires placed around this core. The layered cords most often used are essentially cords of M+N or M+N+P construction, formed from a core of M wires surrounded by at least one layer of N wires, said layer itself being optionally surrounded by an outer layer of P wires, the M, N and even, P wires generally having the same diameter for simplification and cost reasons.

The availability of carbon steels of ever greater strength and endurance means that tire manufacturers nowadays are tending, as far as possible, to use cords having only two layers, in particular so as to simplify the manufacture of these cords, to reduce the thickness of the composite reinforcing plies, and thus reduce tire hysteresis, and ultimately to reduce the cost of the tires themselves and the energy consumption of vehicles fitted with such tires.

For all the above reasons, the two-layer cords most often used at the present time in tire belts are essentially cords of 3+N construction formed from a core or inner layer of 3 wires and an outer layer of N wires (for example, 8 or 9 wires). The outer layer is relatively unsaturated thanks to the large diameter of the inner layer provided by the presence of the 3 core wires, the more so when the diameter of the core wires is chosen to be greater than that of the wires of the outer layer.

As is known, this type of construction promotes the penetration of the cord from the outside by the calendering rubber of the tire or other rubber article during the curing thereof, and consequently makes it possible to improve the fatigue and corrosion-fatigue endurance of the cords, particularly as regards the abovementioned cleavage problem.

Moreover, it is known that good penetration of the cord by rubber makes it possible, thanks to a lesser volume of trapped air in the cord, to reduce the tire curing time ("the press time").

However, cords of 3+N construction have the drawback that they cannot be penetrated right to the core because of the presence of a channel or capillary at the centre of the three core wires, which channel or capillary remains empty after impregnation by the rubber and is therefore propitious, through a kind of "wicking effect", to the propagation of corrosive media such as water. This drawback of cords with a 3+N construction is well known, being discussed for example in the patent applications WO 01/00922, WO 01/49926, WO 2005/071157 and WO 2006/013077.

To solve the above problem, it has been proposed to open the inner layer Ci, by moving its wires further apart, by means of a single centre wire, and to eliminate one wire from the outer layer. The cord thus obtained, of 1+3+(N−1) construction, can be penetrated from the outside right to its centre. Compared with the wires of the inner layer, the centre wire must be neither too fine, as otherwise the intended desaturation effect would not occur, nor too coarse, as otherwise the wire would not remain at the centre of the cord. It is typical to use, for example, a centre wire of 0.12 mm diameter and Ci and Ce layer wires of 0.35 mm diameter (see for example RD (Research Disclosure) August 1990, No. 316107, "Steel cord construction").

This solution is firstly expensive, as it requires adding a wire that moreover does not add to the strength of the cord. It also encounters a manufacturing problem: a high tension in the centre wire is necessary in order to keep the wire at the centre of the cord during cabling, which tension may in certain cases approach the tensile strength of the wire. Finally, removing an outer wire has the consequence of further reducing the strength of the cord per unit cross section.

Again to solve this core penetrability problem of 3+N cords, patent application US 2002/160213 proposes to produce cords of the in-situ-rubberized type. The process proposed here consists in individually sheathing (i.e. sheathing in isolation, "wire to wire") with uncured rubber, upstream of the assembling point of the three wires (or twisting point), just one or preferably each of the three wires in order to obtain a rubber-sheathed inner layer, before the N wires of the outer layer are subsequently put into place by cabling around the thus sheathed inner layer.

The process proposed above poses many problems. Firstly, sheathing just one wire in three (as illustrated for example in FIGS. 11 and 12 of that document) does not ensure that the final cord is filled sufficiently with the rubber compound, and therefore fails to obtain a satisfactory corrosion resistance. Secondly, although wire-to-wire sheathing of each of the three wires (as illustrated for example in FIGS. 2 and 5 of that document) it does actually fill the cord, it results in the use of an excessively large amount of rubber compound. The oozing of rubber compound from the periphery of the final cord then becomes unacceptable under industrial cabling and rubber coating conditions.

Because of the very high tack of uncured rubber, the cord thus rubberized becomes unusable because of it sticking undesirably to the manufacturing tools or between the turns of the cord when the latter is being wound up onto a receiving spool, without mentioning the final impossibility of correctly calendering the cord. It will be recalled here that calendering consists in converting the cord, by incorporation between two uncured rubber layers, into a rubber-coated metal fabric serving as semifinished product for any subsequent manufacture, for example for building a tire.

Another problem posed by individually sheathing each of the three wires is the large amount of space required by having to use three extrusion heads. Because of such a space requirement, the manufacture of cords comprising cylindrical layers (i.e. those with pitches $p_1$ and $p_2$ that differ from one layer to another, or having pitches $p_1$ and $p_2$ that are the same but with twisting directions that differ from one layer to another) must necessarily be carried out in two discontinuous operations: (i) in a first step, individual sheathing of the wires followed by cabling and winding of the inner layer; and (ii) in a second step, cabling of the outer layer around the inner layer. Again because of the high tack of uncured rubber, the winding and intermediate storage of the inner layer require the use of inserts and wide winding pitches when winding onto an intermediate spool, in order to avoid undesirable bonding between the wound layers or between the turns of a given layer.

All the above constraints are punitive from the industrial standpoint and go counter to achieving high manufacturing rates.

SUMMARY OF THE INVENTION

Applicants have discovered a novel layered cord of 3+N construction, rubberized in situ, the specific structure of which, obtained by a particular manufacturing process, enables the aforementioned drawbacks to be alleviated.

One aspect of the invention is directed to a metal cord having two layers (Ci, Ce) of 3+N construction, rubberized in situ, comprising an inner layer (Ci) formed from three core wires of diameter $d_1$ wound together in a helix with a pitch $p_1$ and an outer layer (Ce) of N wires, N varying from 6 to 12, of diameter $d_2$, which are wound together in a helix with a pitch $p_2$ around the inner layer (Ci), said cord being characterized in that it has the following characteristics ($d_1$, $d_2$, $p_1$ and $p_2$ are expressed in mm):

$0.20 < d_1 < 0.50$;
$0.20 < d_2 < 0.50$;
$p_1/p_2 \leq 1$;
$5 < p_1 < 30$;
$10 < p_2 < 30$;

the inner layer is sheathed with a diene rubber composition called a "filling rubber" which, for any length of cord of at least 2 cm, is present in the central channel formed by the three core wires and in each of the gaps lying between the three core wires and the N wires of the outer layer (Ce); and the content of filling rubber in the cord is between 5 and 30 mg per g of cord.

Another aspect of the invention relates to the use of such a cord for reinforcing rubber articles or semifinished products, for example plies, hoses, belts, conveyor belts and tires.

The cord of the invention is most particularly intended to be used as reinforcing element for a belt of a tire intended for industrial vehicles chosen from vans, heavy vehicles—i.e. underground trains, buses, road transport vehicles (lorries, tractors, trailers), off-road vehicles—agricultural or civil engineering machinery, and other transport or handling vehicles.

Another aspect of the invention relates to these rubber articles or semifinished products themselves when they are reinforced with a cord according to an embodiment of the invention, particularly tires intended for industrial vehicles, such as vans or heavy vehicles.

BRIEF DESCRIPTION OF THE DRAWINGS

The invention and its advantages will be readily understood in the light of the following description and embodiments, and FIGS. 1 to 7 relating to these embodiments, which show diagrammatically, respectively:

in cross section, a cord of 3+9 construction according to an embodiment of the invention, of the compact type (FIG. 1);

in cross section, a conventional cord of 3+9 construction, again of the compact type (FIG. 2);

in cross section, a cord of 3+9 construction according to an embodiment of the invention, of the type having cylindrical layers (FIG. 3);

in cross section, a conventional cord of 3+9 construction, again of the type having cylindrical layers (FIG. 4);

in cross section, another conventional cord, of the type having cylindrical layers, of 1+3+8 construction with a centre wire of very small diameter (FIG. 5);

an example of a twisting and in-situ rubber coating installation that can be used for manufacturing cords of the compact type in accordance with an embodiment of the invention (FIG. 6); and in radial section, a heavy duty tire with a radial carcass reinforcement, whether or not in accordance with the invention in this general representation (FIG. 7).

I. MEASUREMENTS AND TESTS

I-1. Tensile Test Measurements

As regards the metal wires and cords, measurements of the breaking force $F_m$ (maximum load in N), the tensile strength denoted by $R_m$ (in MPa) and the elongation at break denoted by $A_t$ (total elongation in %) are carried out in tension according to the ISO 6892 (1984) standard.

As regards the rubber compositions, the modulus measurements are carried out in tension, unless otherwise indicated according to the ASTM D 412 standard of 1998 (specimen "C"): the "true" secant modulus (i.e. that with respect to the actual cross section of the specimen) at 10% elongation, denoted by E10 and expressed in MPa is measured in a second elongation (i.e. after an accommodating cycle), under normal temperature and moisture conditions according to the ASTM D 1349 (1999) standard.

I-2. Air Permeability Test

This test enables the longitudinal air permeability of the tested cords to be determined by measuring the volume of air passing through a specimen under constant pressure over a given time. The principle of such a test, well known to those skilled in the art, is to demonstrate the effectiveness of the treatment of a cord in order to make it impermeable to air. The test has for example been described in the standard ASTM D2692-98.

The test is carried out here either on cords extracted from tires or from the rubber plies which they reinforce, and therefore cords already coated with cured rubber, or on as-manufactured cords.

In the second case, the as-manufactured cords must be coated beforehand from the outside with a coating rubber. To do this, a series of 10 cords arranged so as to be in parallel (with an inter-cord distance of 20 mm) is placed between two skims (two rectangles measuring 80×200 mm) of a cured rubber composition, each skim having a thickness of 3.5 mm. The whole assembly is then clamped in a mould, each of the cords being maintained under sufficient tension (for example 2 daN) in order to ensure that it remains straight when being placed in the mould, using clamping modules. The vulcanization (curing) process takes place over 40 minutes at a temperature of 140° C. and under a pressure of 15 bar (applied by a rectangular piston measuring 80×200 mm). After this, the assembly is demoulded and cut up into 10 specimens of cords thus coated, in the form of parallelepipeds measuring 7×7×20 mm, for characterization.

A conventional tire rubber composition is used as coating rubber, said composition being based on natural (peptized) rubber and N330 carbon black (65 phr), and also containing the following usual additives: sulphur (7 phr), sulphenamide accelerator (1 phr), ZnO (8 phr), stearic acid (0.7 phr), antioxidant (1.5 phr) and cobalt naphthenate (1.5 phr). The modulus E10 of the coating rubber is about 10 MPa.

The test is carried out on 2 cm lengths of cord, hence coated with its surrounding rubber composition (or coating rubber) in the following manner: air under a pressure of 1 bar is injected into the inlet of the cord and the volume of air leaving it is measured using a flowmeter (calibrated for example from 0 to 500 cm$^3$/min). During the measurement, the cord specimen is immobilized in a compressed seal (for example a dense foam or rubber seal) in such a way that only the amount of air passing through the cord from one end to the other, along its longitudinal axis, is measured. The sealing capability of the seal is checked beforehand using a solid rubber specimen, that is to say one without a cord.

The measured average air flow rate (the average over the 10 specimens) is lower the higher the longitudinal impermeability of the cord. Since the measurement is accurate to ±0.2 cm$^3$/min, measured values equal to or lower than 0.2 cm$^3$/min are considered to be zero; they correspond to a cord that can be termed completely airtight along its axis (i.e. along its longitudinal direction).

I-3. Filling Rubber Content

The amount of filling rubber is measured by measuring the difference between the weight of the initial cord (therefore the in-situ rubberized cord) and the weight of the cord (therefore that of its wires) from which the filling rubber has been removed by an appropriate electrolytic treatment.

A cord specimen (of 1 m length), wound on itself in order to reduce its size, constitutes the cathode of an electrolyser (connected to the negative terminal of a generator), whereas the anode (connected to the positive terminal) consists of a platinum wire. The electrolyte consists of an aqueous (demineralised water) solution containing 1 mol per liter of sodium carbonate.

The specimen, completely immersed in the electrolyte, has a voltage applied to it for 15 minutes with a current of 300 mA. The cord is then removed from the bath and abundantly rinsed with water. This treatment enables the rubber to be easily detached from the cord (if this is not so, the electrolysis is continued for a few minutes). The rubber is carefully removed, for example by simply wiping it using an absorbent cloth, while untwisting the wires one by one from the cord. The wires are again rinsed with water and then immersed in a beaker containing a mixture of 50% demineralised water and 50% ethanol. The beaker is immersed in an ultrasonic bath for 10 minutes. The wires thus stripped of all traces of rubber are removed from the beaker, dried in a stream of nitrogen or air, and finally weighed.

From this is deduced, by calculation, the filling rubber content in the cord, expressed in mg (milligrams) of filling rubber per g (gram) of initial cord averaged over 10 measurements (i.e. over 10 meters of the cord in total).

II. DETAILED DESCRIPTION OF THE DRAWINGS

In the present description, unless expressly indicated otherwise, all the percentages (%) indicated are percentages by weight.

Moreover, any interval of values denoted by the expression "between a and b" represents the range of values going from more than a to less than b (i.e. the limits a and b are excluded), whereas any interval of values denoted by the expression "from a to b" means the range of values going from a up to b (i.e. the strict limits a and b are included).

II-1. 3+N Cord of the Invention

The metal cord consisting of two layers (Ci, Ce) of the invention, of 3+N construction, therefore comprises
- an inner layer (Ci) consisting of three core wires of diameter $d_1$ wound together in a helix with a pitch $p_1$; and
- an outer layer (Ce) of N wires, N varying from 6 to 12, of diameter $d_2$ wound together in a helix with a pitch $p_2$ around the inner layer (Ci).

The cord also has the following essential features:
0.20 mm<$d_1$<0.50 mm;
0.20 mm<$d_2$<0.50 mm;
$p_1/p_2 \leq 1$;
5 mm<$p_1$<30 mm;
10 mm<$p_2$<30 mm;
the inner layer is sheathed with a diene rubber composition called a "filling rubber" which, for any length of cord of 2 cm or more, is present in the central channel formed by the three core wires and in each of the gaps or capillaries lying between the three core wires and the N wires of the outer layer (Ce) and;
the content of filling rubber in the cord is between 5 and 30 mg per g of cord.

This cord of the invention may thus be termed an in-situ rubberized cord: its inner layer Ci and its outer layer Ce are separated radially by a sheath of filling rubber which fills, at least partly, each of the gaps or cavities present between the inner layer Ci and the outer layer Ce. Furthermore, its central capillary formed by the three wires of the inner layer is itself also penetrated by the filling rubber.

The cord of the invention has another essential feature, which is that its filling rubber content is between 5 and 30 mg of filling rubber per g of cord.

Below the indicated minimum, it is not possible to guarantee that, over any length of cord of at least 2 cm, the filling rubber is indeed present, at least partly, in each of the gaps of the cord, whereas above the indicated maximum the various problems described above due to filling rubber oozing from the surface on the periphery of the cord can occur. For all these reasons, it is preferable for the filling rubber content to be between 5 and 25 mg, more preferably still in a range from 10 to 20 mg, per g of cord.

Such a filling rubber content, together with this content being controlled within the abovementioned limits, is made possible only by implementing a specific twisting/rubber coating process adapted to the geometry of the 3+N cord, which will be explained in detail below.

The implementation of this specific process, while enabling a cord having a controlled amount of filling rubber to be obtained, guarantees the presence of inner rubber partitions (whether continuous or discontinuous along the axis of the cord) or rubber plugs in the cord of the invention, especially in its central channel, in sufficient numbers. Thus, the cord of the invention becomes impervious to the propagation, along the cord, of any corrosive fluid such as water or oxygen from the air, thus preventing the wicking effect described in the introduction of the present document.

According to one particularly preferred embodiment of the invention, the following feature is verified: over any length of cord of at least 2 cm, the cord is airtight or practically airtight along the longitudinal direction. In other words, each capillary (or cavity) in the 3+N cord, including the central channel formed by the three core wires, has a plug (or inner partition) of filling rubber every 2 cm, in such a way that said cord (once coated from the outside with a polymer such as rubber) is airtight or practically airtight along its longitudinal direction.

In the air permeability test described in Section I-2, an "airtight" 3+N cord is characterized by an average air flow rate of less than or at most equal to 0.2 cm$^3$/min, whereas a "practically airtight" 3+N cord is characterized by an average airflow rate of less than 2 cm$^3$/min, preferably less than 1 cm$^3$/min.

For an optimized compromise between strength, feasibility, stiffness and endurance of the cord in compression, it is preferable for the diameters of the wires of the layers Ci and Ce, whether these wires have the same diameter or a different diameter from one layer to the other, to lie within the range from 0.23 to 0.40 mm.

The wires of the layers Ci and Ce may have a diameter which is the same as or different from one layer to the other. It is preferred to use wires having the same diameter from one layer to the other (i.e. $d_1=d_2$), thereby in particular simplifying their manufacture and reducing their cost.

Preferably, the following relationship is satisfied: $0.5 \leq p_1/p_2 \leq 1$.

As is known, it will be recalled here that the pitch "p" represents the length, measured parallel to the axis of the cord, at the end of which a wire having this pitch makes one complete revolution around said axis of the cord.

More preferably still, the pitches $p_1$ and $p_2$ are the same ($p_1=p_2$). This is in particular the case for layered cords of the compact type, as described for example in FIG. 1, in which the two layers Ci and Ce have the further feature of being wound in the same direction of twist (S/S or Z/Z). In such compact layered cords, the compactness is such that practically no separate layer of wires is visible. It follows that the cross section of such cords has an outline which is polygonal and not cylindrical, as for example illustrated in FIG. 1 (compact 3+9 cord according to the invention) or in FIG. 2 (3+9 compact cord as a control, i.e. one that is not rubberized in situ).

The pitch $p_2$ is chosen more preferably within the range from 12 to 25 mm, for example in the range from 15 to 22 mm, in particular when $d_1=d_2$.

The outer layer Ce has the preferential feature of being a saturated layer, i.e. by definition, there is not sufficient space in this layer add to it at least an ($N_{max}+1$)th wire of diameter $d_2$, $N_{max}$ representing the maximum number of wires that can be wound as a layer around the inner layer Ci. This construction has the advantage of limiting the risk of filling rubber oozing from its surface, and of providing, for a given cord diameter, a higher strength.

Thus, the number N of wires may vary very widely depending on the particular embodiment of the invention, for example from 6 to 12 wires, it being understood that the maximum number $N_{max}$ of wires will be increased if their diameter $d_2$ is reduced in comparison with the diameter $d_1$ of the core wires, so as to preferably keep the outer layer in a saturated state.

According to a preferred embodiment, the layer Ce comprises 8 to 10 wires, in other words the cord of the invention is chosen from the group of cords of 3+8, 3+9 and 3+10 constructions. More preferably, the wires of the layer Ce then satisfy the following relationships:

for $N=8: 0.7 \leq (d_1/d_2) \leq 1$;

for $N=9: 0.9 \leq (d_1/d_2) \leq 1.2$;

for $N=10: 1.0 \leq (d_1/d_2) \leq 1.3$.

Particularly selected from the above cords are those consisting of wires having substantially the same diameter from one layer to the other (i.e. $d_1=d_2$).

According to a particularly preferred embodiment, the outer layer comprises 9 wires.

The 3+N cord of the invention, just like all the layered cords, may be of two types, namely of the compact type or of the cylindrical-layer type.

Preferably, all the wires of the layers Ci and Ce are wound in the same direction of twist, i.e. in the S direction (S/S arrangement) or in the Z direction (Z/Z arrangement). Advantageously, winding layers Ci and Ce in the same direction minimizes the rubbing between these two layers and therefore the wear of their constituent wires.

Figure 1:
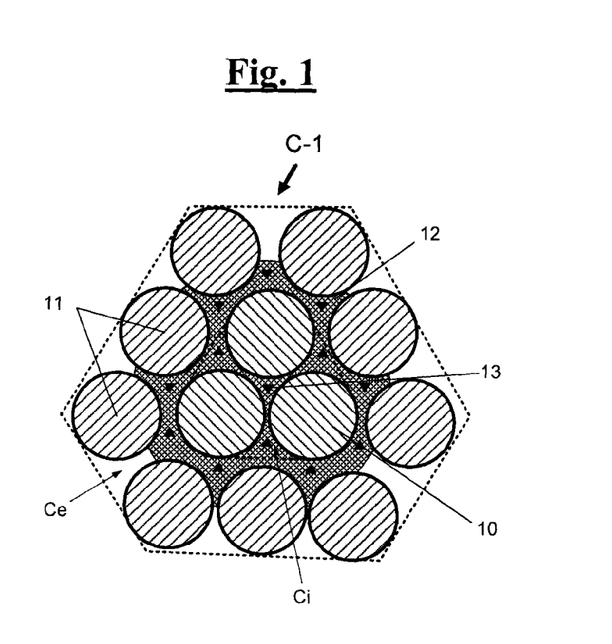

More preferably still, the two layers are wound in the same direction (S/S or Z/Z) and with the same pitch ($p_1=p_2$), in order to obtain a cord of the compact type, as shown for example in FIG. 1.

The term "metal cord" is understood by definition in the present application to mean a cord formed from wires consisting predominantly (i.e. more than 50% by number of these wires) or entirely (100% of the wires) made of a metallic material. The wires of the layer Ci are preferably made of steel, more preferably carbon steel. Independently, the wires of the layer Ce are themselves made of steel, preferably carbon steel. However, it is of course possible to use other steels, for example a stainless steel, or other alloys. When a carbon steel is used, its carbon content is preferably between 0.4% and 1.2%, especially between 0.5% and 1.1%. More preferably, it is between 0.6% and 1.0% (% by weight of steel), such a content representing a good compromise between the mechanical properties required of the composite and the feasibility of the wires.

The metal or steel used, whether in particular a carbon steel or a stainless steel, may itself be coated with a metal layer improving for example the processing properties of the metal cord and/or its constituent components, or the usage properties of the cord and/or of the tire themselves, such as the adhesion, corrosion resistance or ageing resistance properties. According to a preferred embodiment, the steel used is coated with a layer of brass (Zn—Cu alloy) or a layer of zinc. It will be recalled that, during the wire manufacturing process, the brass or zinc coating makes wire drawing easier and makes the wire bond better to the rubber. However, the wires could be coated with a thin metal layer other than brass or zinc, for example having the function of improving the corrosion resistance of these wires and/or their adhesion to rubber, for example a thin layer of Co, Ni, Al, or an alloy of two or more of the compounds Cu, Zn, Al, Ni, Co and Sn.

The cords of the invention are preferably made of carbon steel and have a tensile strength ($R_m$) of preferably greater than 2,500 MPa, more preferably greater than 3,000 MPa. The total elongation at break ($A_t$) of the cord, which is the sum of its structural, elastic and plastic elongations, is preferably greater than 2.0%, more preferably at least 2.5%.

The diene elastomer (or indiscriminately "rubber", the two being considered as synonymous) of the filling rubber is preferably a diene elastomer chosen from the group formed by polybutadienes (BR), natural rubber (NR), synthetic polyisoprenes (IR), various butadiene copolymers, various isoprene copolymers and blends of these elastomers. Such copolymers are more preferably chosen from the group formed by styrene-butadiene (SBR) copolymers, whether these are prepared by emulsion polymerization (ESBR) or solution polymerization (SSBR), butadiene-isoprene (BIR) copolymers, styrene-isoprene (SIR) copolymers and styrene-butadiene-isoprene (SBIR) copolymers.

A preferred embodiment consists in the use of an "isoprene" elastomer, i.e. an isoprene homopolymer or copolymer, in other words a diene elastomer chosen from the group formed by natural rubber (NR), synthetic polyisoprenes (IR), various isoprene copolymers and blends of these elastomers. The isoprene elastomer is preferably natural rubber or a synthetic polyisoprene of the cis-1,4 type. Of these synthetic polyisoprenes, it is preferred to use polyisoprenes having a content (in mol %) of cis-1,4 bonds greater than 90%, more preferably still greater than 98%. According to other preferred embodiments, the diene elastomer may consist, completely or partly, of another diene elastomer such as, for example, an SBR elastomer used unblended or blended with another elastomer, for example of the BR type.

The filling rubber may contain one or more diene elastomers, which may be used in combination with any type of synthetic elastomer other than a diene elastomer, or even with polymers other than elastomers.

The filling rubber is of the crosslinkable type, i.e. it generally includes a crosslinking system suitable for allowing the composition to crosslink during its curing (i.e. hardening) process. Preferably, the crosslinking system of the rubber sheath is what is called a vulcanization system, i.e. one based on sulphur (or on a sulphur donor agent) and a primary vulcanization accelerator. Added to this base vulcanization system may be various known secondary accelerators or vulcanization activators. Sulphur is used in a preferred amount of between 0.5 and 10 phr, more preferably between 1 and 8 phr, and the primary vulcanization accelerator, for example a sulphenamide, is used in a preferred amount of between 0.5 and 10 phr, more preferably between 0.5 and 5.0 phr.

However, the invention also applies to cases in which the filling rubber does not contain sulphur or even any other crosslinking system, it being understood that, for its own crosslinking, the crosslinking or vulcanization system present in the rubber matrix that the cord of the invention is intended to reinforce could suffice and be capable of migrating, by contact with said surrounding matrix, into the filling rubber.

The filling rubber may also include, apart from said crosslinking system, all or some of the additives customarily used in rubber matrices intended for manufacturing tires, such as for example reinforcing fillers, such as carbon black or inorganic fillers such as silica, coupling agents, anti-ageing agents, antioxidants, plasticizing agents or oil extenders, whether these be of an aromatic or non-aromatic type, especially very weakly or non-aromatic oils, for example of the naphthenic or paraffinic type, with a high or preferably a low viscosity, MES or TDAE oils, plasticizing resins having a high $T_g$ above 30° C., processing aids, for making it easy to process the compositions in the uncured state, tackifying resins, antireversion agents, methylene acceptors and donors, such as for example HMT (hexamethylene tetramine) or H3M (hexamethoxymethylmelamine), reinforcing resins (such as resorcinol or bismaleimide), known adhesion promoter systems of the metal salt type, for example cobalt or nickel salts or lanthanide salts, such as those described in particular in application WO 2005/113666.

The content of reinforcing filler, for example carbon black or an inorganic reinforcing filler such as silica, is preferably greater than 50 phr, for example between 60 and 140 phr. It is more preferably greater than 70 phr, for example between 70 and 120 phr. For carbon blacks, for example, all carbon blacks, in particular of the HAF, ISAF and SAF type conventionally used in tires (known as tire-grade blacks), are suitable. Among these, mention may more particularly be made of carbon blacks of ASTM 300, 600 or 700 grade (for example N326, N330, N347, N375, N683 and N772). Suitable inorganic reinforcing fillers are in particular mineral fillers of the silica ($SiO_2$) type, especially precipitated or pyrogenic silicas having a BET surface area of less than 450 $m^2/g$, preferably from 30 to 400 $m^2/g$.

A person skilled in the art will be able, in the light of the present description, to adjust the formulation of the filling rubber so as to achieve the desired levels of properties (especially elastic modulus) and to adapt the formulation to the specific application envisioned.

According to a first embodiment of the invention, the formulation of the filling rubber may be chosen to be the same as the formulation of the rubber matrix that the cord of the invention is intended to reinforce. Thus, there is no problem of compatibility between the respective materials of the filling rubber and the said rubber matrix.

According to a second embodiment of the invention, the formulation of the filling rubber may be chosen to be different from the formulation of the rubber matrix that the cord of the invention is intended to reinforce. The formulation of the filling rubber may in particular be adjusted by using a relatively large amount of adhesion promoter, typically for example from 5 to 15 phr of a metal salt such as a cobalt salt, a nickel salt or a neodymium salt, and by advantageously reducing the amount of said promoter (or even completely eliminating it) in the surrounding rubber matrix.

Preferably, the filling rubber has, in the crosslinked state, a secant modulus in extension E10 (at 10% elongation) which is between 5 and 25 MPa, more preferably between 5 and 20 MPa and is in particular in the range from 7 to 15 MPa.

The invention relates of course to the cord described above both in the uncured state (its filling rubber then not being vulcanized) and in the cured state (its filling rubber then being vulcanized). However, it is preferred to use the cord of the invention with a filling rubber in the uncured state until its subsequent incorporation into the semifinished or finished product such as a tire for which it is intended, so as to promote bonding during the final vulcanization between the filling rubber and the surrounding rubber matrix (for example the calendering rubber).

FIG. 1 shows schematically, in cross section perpendicular to the axis of the cord (assumed to be straight and at rest), an example of a preferred 3+9 cord according to the invention.

This cord (denoted by C-1) is of the compact type, that is to say its inner layer Ci and outer layer Ce are wound in the same direction (S/S or Z/Z according to a recognized nomenclature) and in addition with the same pitch ($p_1 = p_2$). This type of construction has the consequence that the inner wires (10) and outer wires (11) form two concentric layers each having an outline (shown by the dotted lines) which is substantially polygonal (triangular in the case of the layer Ci and hexagonal in the case of the layer Ce), and not cylindrical as in the case of the cylindrically layered cords that will be described later.

The filling rubber (12) fills the central capillary (13) (symbolized by a triangle) formed by the three core wires (10), very slightly moving them apart, while completely covering the inner layer Ci formed by the three wires (10). It also fills each gap or cavity (also symbolized by a triangle) formed either by one core wire (10) and the two outer wires (11) that are immediately adjacent thereto, or by two core wires (10) and the outer wire (11) that is adjacent thereto. In total, 12 gaps or capillaries are thus present in this 3+9 cord, to which the central capillary (13) is added.

According to a preferred embodiment, in the 3+N cord of the invention, the filling rubber extends in a continuous manner around the layer Ci that it covers.

Figure 2:
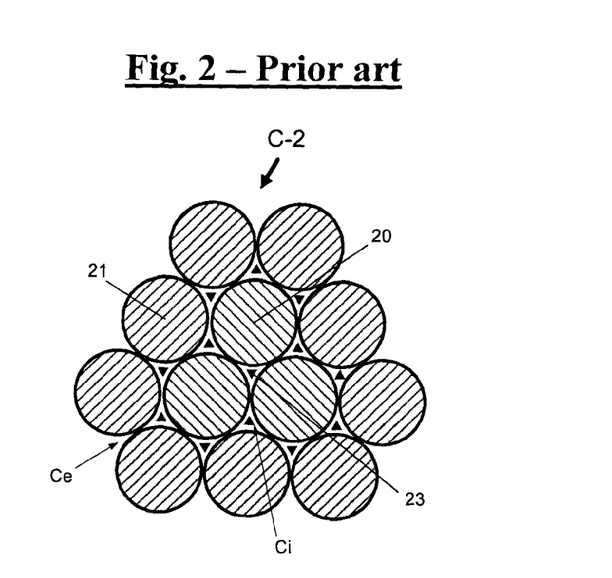

In comparison, FIG. 2 shows the cross section of a conventional 3+9 cord (denoted by C-2) (i.e. one not rubberized in situ), also of the compact type. The absence of filling rubber means that practically all the wires (20, 21) are in contact with one another, thereby resulting in a particularly compact structure, one which is moreover very difficult to penetrate (not to say impenetrable) from the outside by rubber. The feature of this type of cord is that the three core wires (20) form a central capillary or channel (23) which is empty and closed, and therefore propitious, through the "wicking" effect, to the propagation of corrosive media such as water.

Figure 3:
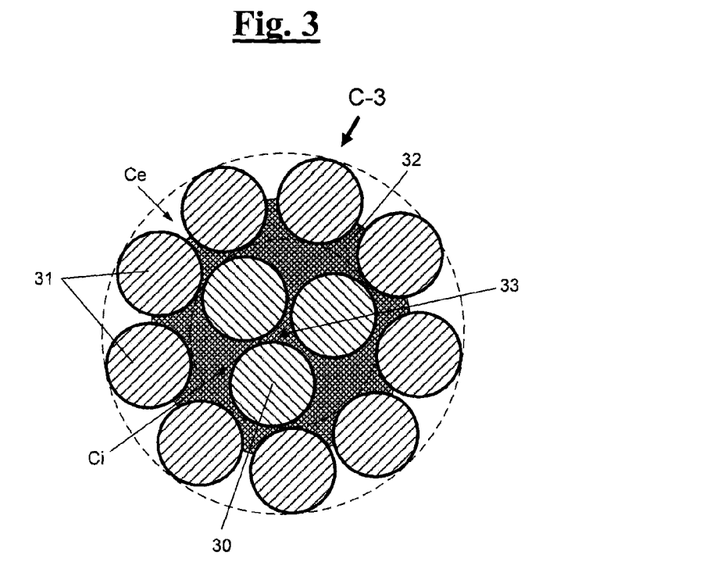

FIG. 3 shows schematically another example of a preferred 3+9 cord according to the invention.

This cord (denoted by C-3) is of the cylindrically layered type, i.e. its inner layer Ci and outer layer Ce are either wound with the same pitch ($p_1 = p_2$), but in a different direction (S/Z or Z/S), or wound with a different pitch ($p_1 \neq p_2$) whatever the directions of twist (S/S or Z/Z or S/Z or Z/S). As is known, this type of construction has the consequence that the wires are arranged in two adjacent concentric tubular layers (Ci and Ce) giving the cord (and the two layers) an outline (represented by the dotted lines) which is cylindrical and no longer polygonal.

The filling rubber (32) fills the central capillary (33) (symbolized by a triangle) formed by the three core wires (30), slightly moving them apart, while completely covering the inner layer Ci formed by the three wires (30). It also fills, at least partly (but here, in this example, completely), each gap or cavity formed either by one core wire (30) and the two outer wires (31) that are immediately adjacent thereto (the closest ones), or by two core wires (30) and the outer wire (31) that is adjacent thereto. In total, 12 gaps or capillaries are thus present in this 3+9 cord, to which the central capillary (33) is added.

Figure 4:
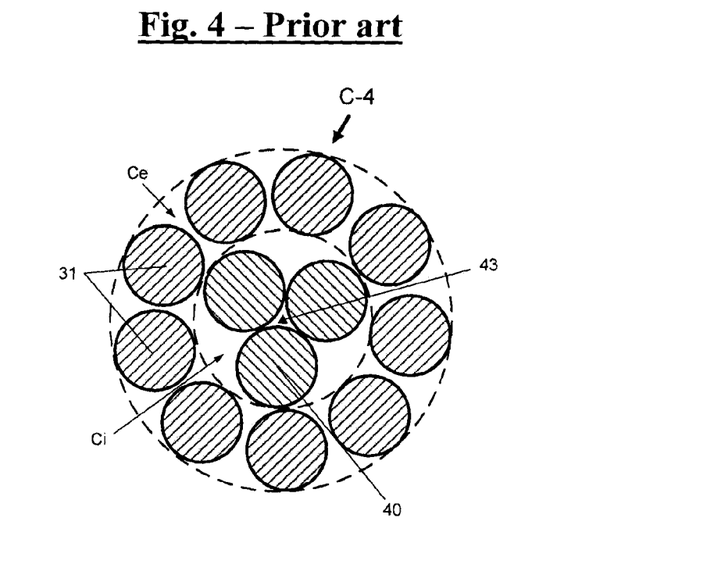

For comparison, FIG. 4 shows the cross section of a conventional 3+9 cord (denoted by C-4) (i.e. one not rubberized in situ), also of the type consisting of two cylindrical layers. The absence of filling rubber means that the three wires (40) of the inner layer (Ci) are practically in contact with each other, thereby resulting in a central capillary (43) which is empty and closed, impenetrable from the outside by rubber and also propitious to the propagation of corrosive media.

Figure 5:
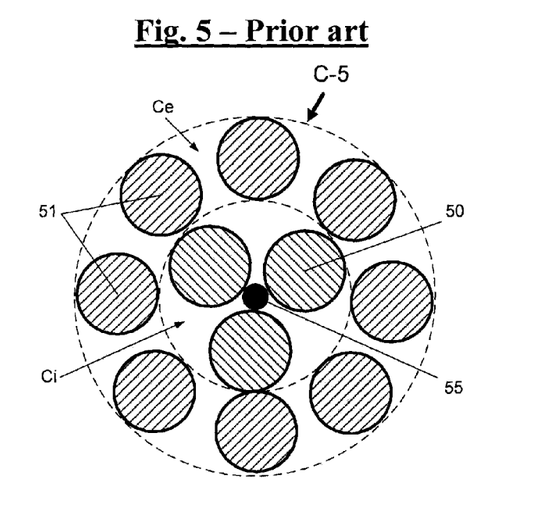

Also for comparison, FIG. 5 shows schematically the cross section of a conventional 1+3+8 cord (denoted by C-5) (i.e. one not rubberized in situ), also of the type consisting of two cylindrical layers (Ci, Ce), which comprises a centre wire (55) of very small diameter, three inner wires (50) and eight outer wires (51). The centre wire (55), which moves the wires (50) of the inner layer Ci apart and fills as it were the central channel formed by these three core wires (50), makes it possible to "desaturate" (by increasing the diameter of the inner layer Ci) the outer layer Ce (given wire diameters identical from one layer to the other) and to thus increase the outer penetrability of the cord.

II-2. Manufacture of the 3+N Cord

The cord of 3+N construction described above may be manufactured by a process comprising the following four steps carried out in line:

firstly an assembling step, by twisting the three core wires together, in order to form the inner layer (Ci) at an assembling point;

next, downstream of said point for assembling the three core wires, a sheathing step, in which the inner layer (Ci) is sheathed with the uncured (i.e. uncrosslinked) filling rubber;

followed by an assembling step in which the N wires of the outer layer (Ce) are twisted around the thus sheathed inner layer (Ci); and then a final step of balancing the twists.

It will be recalled here that there are two possible techniques for assembling metal wires:

either by cabling: in such a case, the wires undergo no twisting about their own axis, because of a synchronous rotation before and after the assembling point;

or by twisting: in such a case, the wires undergo both a collective twist and an individual twist about their own axis, thereby generating a untwisting torque on each of the wires.

One essential feature of the above process is the use, when assembling both the inner layer and the outer layer, of a twisting step.

During the first step, the three core wires are twisted together (S or Z direction) in order to form the inner layer Ci, in a manner known per se. The wires are delivered by supply means, such as spools, a separating grid, whether or not coupled to an assembling guide, intended to make the core wires converge on a common twisting point (or assembling point).

The inner layer (Ci) thus formed is then sheathed with uncured filling rubber, supplied by an extrusion screw at a suitable temperature. The filling rubber may thus be delivered to a single fixed point, of small volume, by means of a single extrusion head without having to individually sheath the wires upstream of the assembling operations, before formation of the inner layer, as described in the prior art.

This process has the considerable advantage of not slowing down the conventional assembling process. It thus makes it possible for the complete operation—initial twisting, rubber coating and final twisting—to be carried out in line and in a single step, whatever the type of cord produced (compact cord or cylindrically layered cord), all at high speed. The above process can be carried out with a speed (cord run speed along the twisting and rubber coating line) of greater than 70 m/min, preferably greater than 100 m/min.

Upstream of the extrusion head, the tension exerted on the three wires, which is substantially the same from one wire to another, is preferably between 10 and 25% of the breaking force of the wires.

The extrusion head may comprise one or more dies, for example an upstream guiding die and a downstream sizing die. Means for continuously measuring and controlling the diameter of the cord may be added, these being connected to the extruder. Preferably, the temperature at which the filling rubber is extruded is between 60° C. and 120° C., more preferably between 70° C. and 110° C.

The extrusion head thus defines a sheathing zone having the shape of a cylinder of revolution, the diameter of which is preferably between 0.4 mm and 1.2 mm, more preferably between 0.5 et 1.0 mm, and the length of which is preferably between 4 and 10 mm.

The amount of filling rubber delivered by the extrusion head may be easily adjusted in such a way that, in the final 3+N cord, this amount is between 5 and 30 mg, preferably between 5 and 25 mg and especially in the range from 10 to 20 mg per g of cord.

Typically, on leaving the extrusion head, the inner layer Ci is covered, at all points on its periphery, with a minimum thickness of filling rubber preferably greater than 5 μm, more preferably greater than 10 μm, for example between 10 and 50 μm.

At the end of the preceding sheathing step, the process involves, during a third step, the final assembling, again by twisting (S or Z direction) the N wires of the outer layer (Ce) around the inner layer (Ci) thus sheathed. During the twisting operation, the N wires bear on the filling rubber, becoming encrusted therein. The filling rubber, displaced by the pressure exerted by these outer wires, then naturally has a tendency to at least partly fill each of the gaps or cavities left empty by the wires, between the inner layer (Ci) and the outer layer (Ce).

At this stage, the 3+N cord of the invention is not finished: its central channel, bounded by the three core wires, has not yet been filled with filling rubber, or in any case insufficiently for obtaining acceptable air impermeability.

The essential following step consists in making the cord pass through twist balancing means. The term "twist balancing" is understood here to mean, as is known, the cancelling out of residual torques (or untwisting springback) exerted on each wire of the cord both in the inner layer and in the outer layer.

Twist balancing tools are well known to those skilled in the twisting art. They may for example consist of "straighteners", "twisters" or "twister-straighteners" consisting either of pulleys in the case of twisters, or small-diameter rollers in the case of straighteners, through which pulleys and/or rollers said cord runs.

It is assumed a posteriori that, during passage through these balancing tools, the untwisting exerted on the three core wires, resulting in an at least partial reverse rotation of these wires about their axis, is sufficient to force or drive the filling rubber in the green state (i.e. uncrosslinked or uncured filling rubber) while still hot and relatively fluid from the outside towards the core of the cord, into the very inside of the central channel formed by the three wires, providing in fine the cord of the invention with the excellent air impermeability property that characterizes it. In addition the function of the straightening, applied by using a straightening tool, is thought to have the advantage that the contact between the rollers of the straightener and the wires of the outer layer exert additional pressure on the filling rubber, thus further promoting its penetration into the central capillary formed by the three core wires.

In other words, the process described above uses the rotation of the three core wires, in the final manufacturing stage of the cord, to distribute the filling rubber naturally and uniformly inside and around the inner layer (Ci), while perfectly controlling the amount of filling rubber supplied.

Thus, unexpectedly, it has proved possible to make the filling rubber penetrate into the very core of the cord of the invention, by depositing the rubber downstream of the point where the three wires are assembled and not upstream thereof, as described in the prior art, while still controlling and optimizing the amount of filling rubber delivered by the use of a single extrusion head.

After this final twist balancing step, the manufacture of the cord according to the invention is complete. This cord may then be wound up on a receiving spool, for storage, before being for example treated through a calendering unit in order to prepare a metal/rubber composite fabric.

The process described above makes it possible to manufacture cords in accordance with the invention that may advantageously have no (or virtually no) filling rubber on their periphery. Such an expression means that no particle of filling rubber is visible to the naked eye on the periphery of cord, that is to say a person skilled in the art can discern, after manufacture, no difference, to the naked eye and at a distance of two or three meters, between a spool of cord according to the invention and a spool of conventional cord not rubberized in situ.

Of course, this process applies to the manufacture both of compact cords (as a reminder, and by definition, those in which the layers Ci and Ce are wound with the same pitch and in the same direction) and cylindrically layered cords (as a reminder, and by definition, those in which the layers Ci and Ce are wound either with different pitches, or in opposite directions, or else with different pitches and in opposite directions).

An assembling/rubber coating device that can be used for implementing the process described above is a device comprising, from the upstream end to the downstream end, along the direction of advance of a cord in the course of being formed:

means for supplying the three core wires;
    means for assembling the three core wires by twisting them together to form the inner layer;
    means for sheathing the inner layer;
    downstream of the sheathing means, means for assembling the outer wires by twisting them around the inner layer thus sheathed, to form the outer layer; and, finally,
    twist balancing means.

Figure 6:
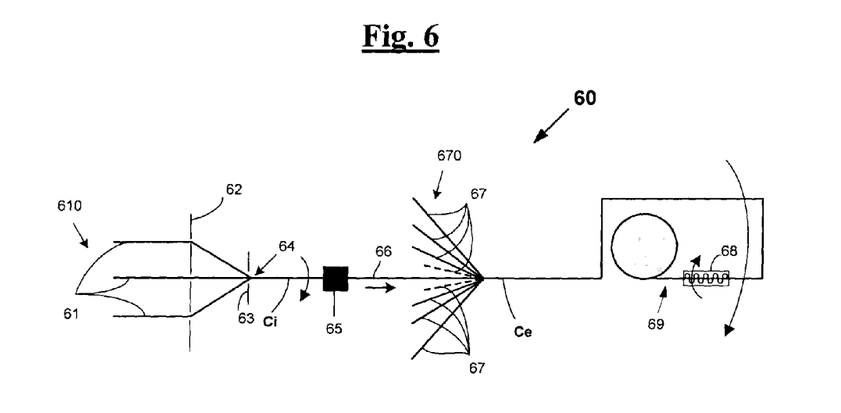

FIG. 6 shows an example of a twisting assembling device (60), of the type having a stationary feed and a rotating receiver, which can be used for the manufacture of a compact cord (layers Ci and Ce twisted in the same direction of twist and with $p_2=p_3$) as illustrated for instance in FIG. 1. In this device, feed means (610) deliver three core wires (61) through a distributing grid (62) (an axisymmetric distributor), which grid may or may not be coupled to an assembling guide (63), beyond which the three core wires converge on an assembling point (64), in order to form the inner layer (Ci).

The inner layer Ci, once formed, then passes through a sheathing zone consisting, for example, of a single extrusion head (65) through which the inner layer is intended to pass. The distance between the point of convergence (64) and the sheathing point (65) is for example between 50 cm and 1 m. The N wires (67) of the outer layer (Ce), for example nine wires, delivered by feed means (670), are then assembled by being twisted around the thus rubber-coated inner layer Ci (66) progressing along the direction of the arrow. The final 3+N cord thus formed is finally collected on a rotating receiver (69) after having passed through the twist balancing means (68) consisting for example, of a twister-straightener.

It will be recalled here that, as is well known to those skilled in the art, a cord according to the invention of the cylindrical layer type as illustrated for example in FIG. 3 (different pitches $p_2$ et $p_3$ and/or different direction of twist of the layers Ci and Ce) will be manufactured using a device comprising two rotating (feed or receiver) members rather than one as described above (FIG. 6) by way of example.

II-3. Use of the Cord in Tire Crown Reinforcement

As explained in the introduction of the present document, the cord of the invention is particularly intended for a crown reinforcement of a tire for industrial vehicles of the heavy-vehicle type.

Figure 7:
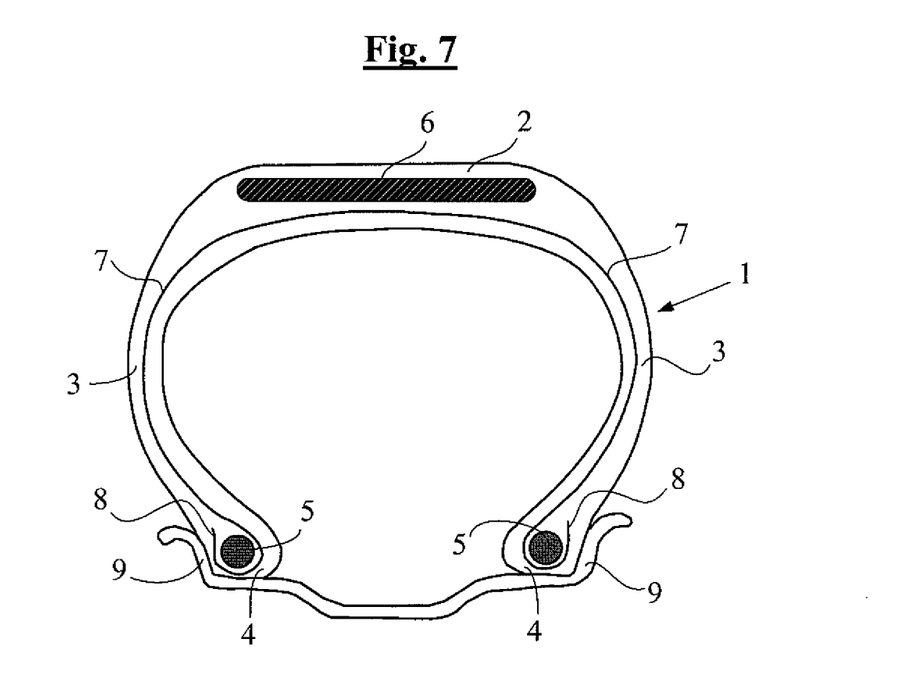

As an example, FIG. 7 shows schematically a radial cross section through a tire with a metal crown reinforcement, which may or may not be in accordance with the invention, in this general representation. This tire 1 comprises a crown 2 reinforced by a crown reinforcement or belt 6, two sidewalls 3 and two beads 4, each of these beads 4 being reinforced by a bead wire 5. The crown 2 is covered with a tread (not shown in this schematic figure). A carcass reinforcement 7 is wound around the two bead wires 5 in each bead 4, the turn-up 8 of this reinforcement 7 laying for example to the outside of the tire 1, which is shown here mounted on its rim 9. As is known per se, the carcass reinforcement 7 is formed by at least one ply reinforced by "radial" cords, that is to say these cords are practically parallel with one another and extend from one bead to the other so as to make an angle of between 80° and 90° with the median circumferential plane (the plane perpendicular to the rotation axis of the tire, which is located halfway between the two beads 4 and passes through the middle of the crown reinforcement 6).

The tire according to the invention is characterized in that its belt 6 comprises at least, as reinforcement for at least one of the belt plies, a metal cord consisting of two layers in accordance with the invention. In this belt 6 shown schematically in a very simple manner in FIG. 7, it will be understood that the cords of the invention may for example reinforce some or all of what are called the "working" belt plies. Of course, this tire 1 also includes, as is known, an inner layer of rubber compound or elastomer (usually called "inner liner") that defines the radially inner face of the tire and is intended to protect the carcass ply from the diffusion of air coming from the space inside the tire.

In this belt ply, the density of the cords according to the invention is preferably between 15 and 110, more preferably between 30 and 70, cords per dm (decimeter) of belt ply, the distance between two adjacent cords, from axis to axis, preferably being between 1.2 and 6.5 mm, more preferably between 1.3 and 3.0 mm.

The cords according to the invention are preferably arranged in such a way that the width (denoted by L) of the rubber bridge between two adjacent cords is between 0.4 and 2.0 mm. As is known, this width L represents the difference between the calendering pitch (the lay pitch of the cord in the rubber fabric) and the diameter of the cord. Below the minimum value indicated, the rubber bridge, being too narrow, runs the risk of being mechanically degraded during working of the ply, especially during the deformations undergone in its own plane by extension or by shear. Above the indicated maximum, there is a risk of objects penetrating, by perforation, between the cords. More preferably, for the same reasons, the width L is chosen to be between 0.6 and 1.6 mm.

Preferably, the rubber composition used for the fabric of the belt ply has, in the vulcanized state (i.e. after curing), a secant modulus in extension E10 of between 5 and 25 MPa, more preferably between 5 and 20 MPa, especially in the range from 7 to 15 MPa, when this fabric is intended to form a working ply of the belt.

III. EMBODIMENTS OF THE INVENTION

The following tests demonstrate the capability of the invention to provide cords with substantially improved endurance, in the tire belt, thanks to an excellent air impermeability property along their longitudinal axis.

III-1. Nature and Properties of the Wires and Cords Used

In the following tests, layered cords of 3+9 or 1+3+8 construction as depicted in FIGS. 1 and 5, formed from fine brass-coated carbon steel wires, were used.

The carbon steel wires were prepared in a known manner, for example from machine wires (5 to 6 mm in diameter) which was firstly work-hardened, by rolling and/or drawing, down to an intermediate diameter close to 1 mm. The steel used for the cord C-1 according to the invention was a carbon steel of very high strength (referred to as SHT [Super High Tensile] steel), the carbon content of which is about 0.92%, containing about 0.2% chromium, the rest being formed from iron and the usual unavoidable impurities due to the steel manufacturing process. That used for the control cord C-5 was a high-strength carbon steel (referred to as HT [High Tensile] steel), the carbon content of which was about 0.82%, containing about 0.5% manganese (the rest being formed from iron and impurities).

The wires of intermediate diameter underwent a degreasing and/or pickling treatment before their subsequent conversion. After a brass coating had been deposited on these intermediate wires, what is called a "final" work-hardening operation was carried out on each wire (i.e. after the final patenting heat treatment), by cold-drawing it in a wet medium with a drawing lubricant for example in the form of an aqueous emulsion or dispersion.

The steel wires thus drawn had the following diameters and mechanical properties:

TABLE 1

| Steel | $\phi$ (mm) | $F_m$ (N) | $R_m$ (MPa) |
| --- | --- | --- | --- |
| SHT | 0.30 | 226 | 3200 |
| HT | 0.35 | 263 | 2765 |

The brass coating surrounding the wires had a very small thickness, much less than a micron, for example around 0.15 to 0.30 μm, which is negligible compared with the diameter of the steel wires. Of course, the composition of the steel used for the wire was, in terms of its various elements (for example C, Cr, Mn), the same as that used for the steel of the starting wire.

These wires were then assembled in the form of layered cords of 3+9 construction (reference C-1 in FIG. 1) and of 1+3+8 construction (reference C-5 in FIG. 5), the construction of which is in accordance with the cords shown in FIGS. 1 and 5 respectively and the mechanical properties of which are given in Table 2.

TABLE 2

| Cord | $p_1$ (mm) | $p_2$ (mm) | $F_m$ (daN) | $R_m$ (MPa) | $A_t$ (%) |
|------|------|------|------|------|------|
| C-1 | 15.4 | 15.4 | 258 | 3140 | 2.5 |
| C-5 | 7.7 | 15.4 | 274 | 2590 | 2.5 |

The 3+9 cord of the invention (C-1), as depicted in FIG. 1, was formed in total from 12 wires, all of 0.30 mm diameter, which were wound with the same pitch ($p_1=p_2=15.4$ mm) and in the same direction of twist (S) in order to obtain a compact cord. The content of rubber filling rubber, measured according to the method indicated above in Section I-3, was 16 mg per g de cord. This filling rubber fills the central channel or capillary formed by the three core wires, slightly moving them apart, while completely covering the inner layer Ci formed by the three wires. It also fills, at least partly, if not completely, each of the twelve gaps or capillaries formed either by one cord wire and the two outer wires that are immediately adjacent thereto, or by two core wires and the outer wire that is adjacent thereto.

To manufacture this cord, a device as described above and depicted in FIG. 6 was used. The filling rubber was a conventional rubber composition for a tire crown reinforcement, having the same formulation as that of the rubber ply for the belt that the cord C-1 is intended to reinforce in the following test. This composition was extruded at a temperature of 90° C. through a 0.700 mm sizing die.

The control cord (C-5) of 1+3+8 construction, as depicted in FIG. 5, was formed in total from 12 wires, of which 11 wires had a diameter of 0.35 mm. It comprised an inner layer Ci of three wires wound together in a helix (S direction) with a pitch $p_1$ equal to 7.7 mm, this layer Ci being in contact with a cylindrical outer layer of 8 wires which were themselves wound together in a helix (S direction) around the core with a pitch $p_2$ equal to 15.4 mm. Thanks to its single centre wire of very small diameter (0.12 mm), the wires of the inner layer Ci were moved apart, the cord becoming penetrable from the outside right into its centre. This control cord C-5 had no filling rubber.

III-2. Tire Endurance

The layered cords C-1 and C-5 were then incorporated by calendering into rubber plies (skims) consisting of a composition used conventionally for manufacturing belt plies of radial tires for heavy vehicles. This composition was based on natural (peptized) rubber and N330 carbon black (55 phr). It also contained the following usual additives: sulphur (6 phr), sulphenamide accelerator (1 phr), ZnO (9 phr), stearic acid (0.7 phr), antioxidant (1.5 phr) and cobalt naphthenate (1 phr). The modulus E10 of the filling rubber was about 6 MPa.

The composite fabrics thus calendered therefore had a rubber matrix formed from two thin layers (about 0.8 mm in thickness) of rubber compound that were superposed on either side of the cords. The calendering pitch (the lay pitch of the cords in the rubber fabric) was about 2.5 mm. Given the diameter of the cords (about 1.3 and 1.5 mm for the cords C-1 and C-5 respectively), the rubber compound thickness on the back of the cords was between about 0.4 and 0.6 mm.

Two series of running tests were then carried out on heavy vehicle tires (denoted by P-1 and P-5) of 315/80 R22.5 dimensions, with, in each series, tires intended for running and others for decortication on a new tire.

The tires P-1 reinforced by the cords C-1 of the invention were therefore tires in accordance with the invention. The tires P-5 reinforced by the cords C-5 constituted the control tires of the prior art—because of their recognized performance, they constitute a control of choice in this test, especially in comparison with conventional cords of 3+9 construction (with no single centre wire).

The tires P-1 and P-5 were therefore identical, except for the cords C-1 and C-5 reinforcing their belt 6.

In particular, their crown reinforcements or belts 6 were formed, in a manner known per se, from two triangulation half-plies reinforced with metal cords inclined at 65 degrees, on top of which were two superposed crossed "working plies". These working plies were reinforced by the above metal cords (C-1 and C-5 respectively) placed substantially parallel to one another and inclined at 26 degrees (radially inner ply) and at 18 degrees (radially outer ply). The two working plies were also covered by a protective ply reinforced with conventional elastic (high-elongation) metal cords inclined at 18 degrees. All the angles of inclination indicated were measured relative to the median circumferential plane.

These tires underwent a stringent running test, under overload conditions, intended to test their resistance to the cleavage phenomenon (i.e. the separation of the ends of the belt plies) by subjecting the tires, on an automatic rolling machine, to sequences of very fierce cornering and severe compression of their crown block in the shoulder zone.

The test was carried out until the tires had been forcibly destroyed. It was then observed that the tires P-1 reinforced by the cords of the invention, under the very stringent running conditions imposed thereon, had much better endurance: the average distance traveled was 20% greater than that of the control tires which furthermore already exhibited excellent performance.

III-3. Air Permeability Tests

The cords C-1 of the invention were also subjected to the air permeability test described in the Section I-2 by measuring the volume of air (in $cm^3$) passing through the cords in 1 minute (taking the average of 10 measurements for each cord tested).

For each cord C-1 tested and for 100% of the measurements (i.e. ten specimens in ten), a flow rate of less than 0.2 $cm^3$/min or zero was measured. In other words the cords of the invention may be termed airtight along their axes—they therefore have an optimum amount of penetration by the rubber.

Control cords rubberized in situ, of the same construction as the compact cords C-1 of the invention, were prepared by individually sheathing either a single wire or each of the three wires of the inner layer Ci. This sheathing was carried out using extrusion dies of variable diameter (320 to 420 μm) this time placed upstream of the assembling point (sheathing and twisting in line) as described in the prior art (the aforementioned application US 2002/160213). For a strict comparison, the amount of filling rubber was moreover adjusted in such a way that the content of filling rubber in the final cords (between 6 and 25 mg/g of cord, measured according to the method given in Section I-3), was close to that of the cords of the invention.

In the case of sheathing a single wire, whatever the cord tested, it was observed that 100% of the measurements (i.e. 10 specimens in 10) indicated an air flow rate greater than 2 $cm^3$/min. The measured average flow rate varied from 16 to 62 $cm^3$/min under the operating conditions used, in particular the extrusion die diameter tested.

In the case of individually sheathing the three wires, even though the measured average flow rate (varying from 0.2 to 4 $cm^3$/min) proved to be lower than the previous values, it was observed that:

in the worst case (320 μm die), 90% of the measurements (i.e. 9 specimens in 10) had a flow rate greater than 2 cm³/min, with an average flow rate of 4 cm³/min;

in the best case (420 μm die), 10% of the measurements (i.e. 1 specimen in 10) still had a flow rate of about 2 cm³/min, with an average flow rate close to 0.2 cm³/min.

In other words, none of the above control cords tested can be termed a cord that is airtight along its longitudinal axis, within the meaning of the test in Section I-2. Furthermore, those cords having the lowest air permeability had a relatively large amount of filling rubber on their periphery, making them unsuitable for a calendering operation under industrial conditions.

Of course, the invention is not limited to the embodiments described above.

Thus, for example, the cord of the invention could be used for reinforcing articles other than tires, for example hoses, belts and conveyor belts. Advantageously, it could also be used for reinforcing parts of tires other than their crown reinforcements, especially as carcass reinforcements of tires for industrial vehicles such as heavy vehicles.

The invention also relates to any multistrand steel cord (or multistrand rope), the structure of which incorporates, as elementary strand, at least one layered cord according to the invention.

As examples of multistrand ropes according to the invention, which can for example be used in tires for industrial vehicles of the civil engineering type, mention may in particular be made of multistrand ropes of the following constructions:

(1+6)(3+N) formed in total from seven elementary strands, one at the centre and the six other strands cabled around the centre;

(3+9)(3+N) formed in total from twelve elementary strands, three at the centre and the nine others cabled around the centre, in which each elementary strand formed by a layered cord of 3+N, especially 3+8 or 3+9, construction, whether of the compact type or cylindrically layered, is a strand according to the invention.

Such multistrand steel ropes, especially of the (1+6)(3+N) or (3+9)(3+N) construction, could themselves be rubberized in situ during their manufacture.

The invention claimed is:

1. A metal cord having two layers (Ci, Ce) of 3+N construction, rubberized in situ, comprising an inner layer (Ci) formed from three core wires of diameter $d_1$ wound together in a helix with a pitch $p_1$ and an outer layer (Ce) of N wires, N varying from 6 to 12, of diameter $d_2$, which are wound together in a helix with a pitch $p_2$ around the inner layer (Ci), wherein said cord is obtained by sheathing the inner layer formed by the three core wires with a diene rubber composition called a "filling rubber" which, for any length of cord of at least 2 cm, is present in the central channel formed by the three core wires and in each of the gaps lying between the three core wires and the N wires of the outer layer (Ce); and the content of filling rubber in the cord is between 5 and 30 mg per g of cord, and wherein said cord has the following characteristics ($d_1$, $d_2$, $p_1$ and $p_2$ are expressed in mm):

$0.20 < d_1 < 0.50$;
$0.20 < d_2 < 0.50$;
$p_1/p_2 \le 1$;
$5 < p_1 < 30$;
$10 < p_2 < 30$, wherein $d_1$ and $d_2$ are wire diameters and $p_1$ and $p_2$ are winding pitches, wherein substantially no filling rubber is present on a periphery of the cord, wherein the filling rubber is uniformly distributed inside and around the inner layer, wherein, in an air permeability test according to ASTM D2692-98, the cord has an average air flow rate of less than 2 cm³/min, and wherein the filling rubber is uniformly distributed inside and around the inner layer by twist balancing.

2. The cord according to claim 1, wherein the diene elastomer of the filling rubber is chosen from the group formed by polybutadienes, natural rubber, synthetic polyisoprenes, butadiene copolymers, isoprene copolymers and blends of these elastomers.

3. The cord according to claim 2, wherein the diene elastomer is natural rubber.

4. The cord according to claim 1, wherein the following relationships are satisfied ($d_1$ and $d_2$ being in mm):

$0.23 \le d_1 \le 0.40$;

$0.23 \le d2 \le 0.40$.

5. The cord according to claim 1, wherein the following relationship is satisfied:

$0.5 \le p1/p_2 \le 1$.

6. The cord according to claim 1, wherein $p_1 = p_2$.

7. The cord according to claim 6, wherein $p_2$ lies in the range from 12 to 25 mm.

8. The cord according to claim 1, wherein the wires of the outer layer (Ce) are wound in a helix with the same pitch and in the same direction of twist as the wires of the inner layer (Ci).

9. The cord according to claim 1, wherein the outer layer is a saturated layer.

10. The cord according to claim 1, wherein the outer layer (Ce) comprises 8, 9 or 10 wires.

11. The cord according to claim 10, wherein the wires of the outer layer (Ce) satisfy the following relationships:

for $N=8$: $0.7 \le (d_1/d_2) \le 1$;

for $N=9$: $0.9 \le (d_1/d_2) \le 1.2$;

for $N=10$: $1.0 \le (d_1/d_2) \le 1.3$.

12. The cord according to claim 1, wherein $d_1 = d_2$.

13. The cord according to claim 12, wherein the outer layer comprises 9 wires.

14. The cord according to claim 1, wherein the content of filling rubber is between 5 and 25 mg per g of cord.

15. The cord according to claim 14, wherein the content of filling rubber lies in the range from 10 to 20 mg per g of cord.

16. The cord according to claim 1, wherein, in the air permeability test according to ASTM D2692-98, the cord has an average air flow rate of less than 0.2 cm³/min.

17. A multistrand cord, at least one of the strands of which is a cord according to claim 1.

18. A tire comprising a cord according to claim 1.

19. A tire according to claim 18, said tire being an industrial vehicle tire.

20. A tire according to claim 18, the cord being present in the belt of the tire.

* * * * *